Oct. 8, 1940.                    H. M. BACON                    2,216,999
                           LUG STRAP CONSTRUCTION
                           Filed Sept. 12, 1938          5 Sheets-Sheet 1
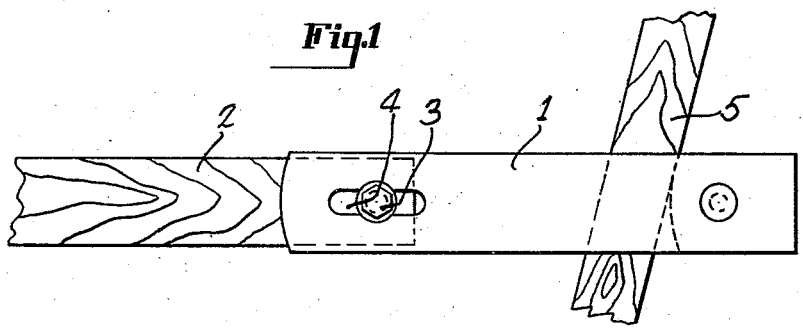
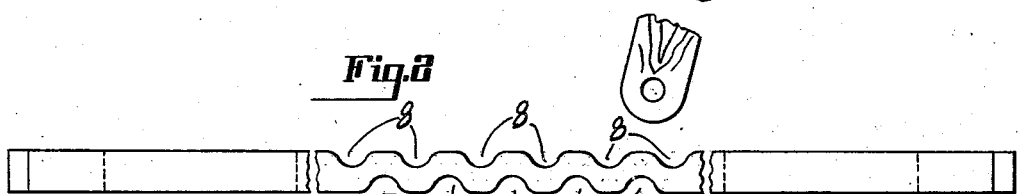
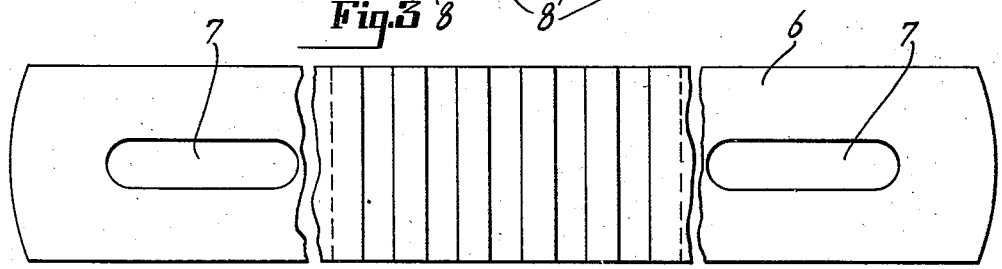
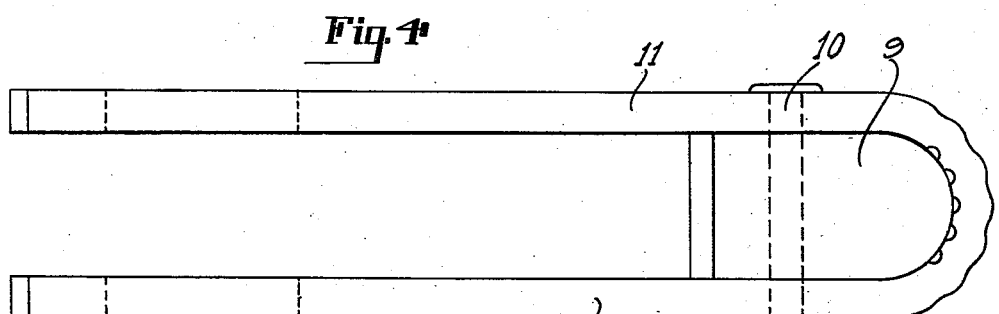
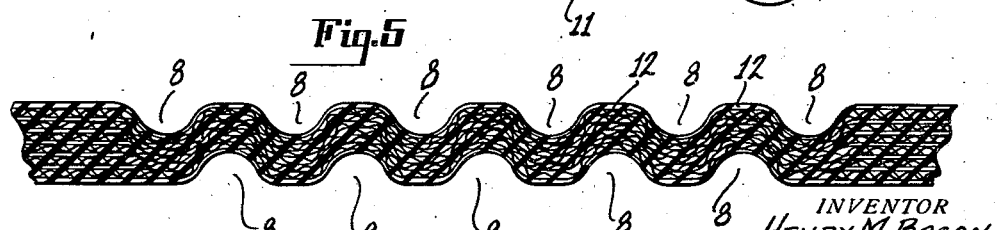
INVENTOR
HENRY M. BACON
BY Toulmin & Toulmin
ATTORNEYS

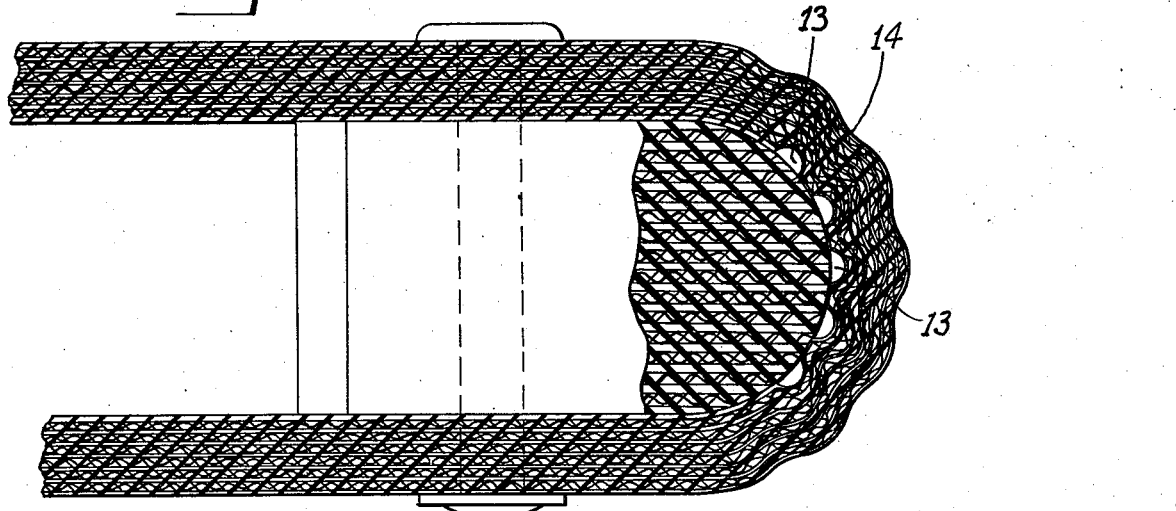
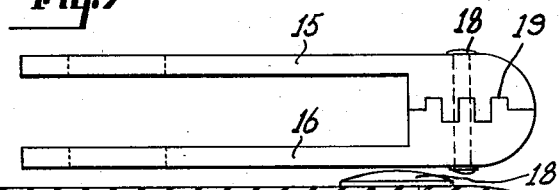
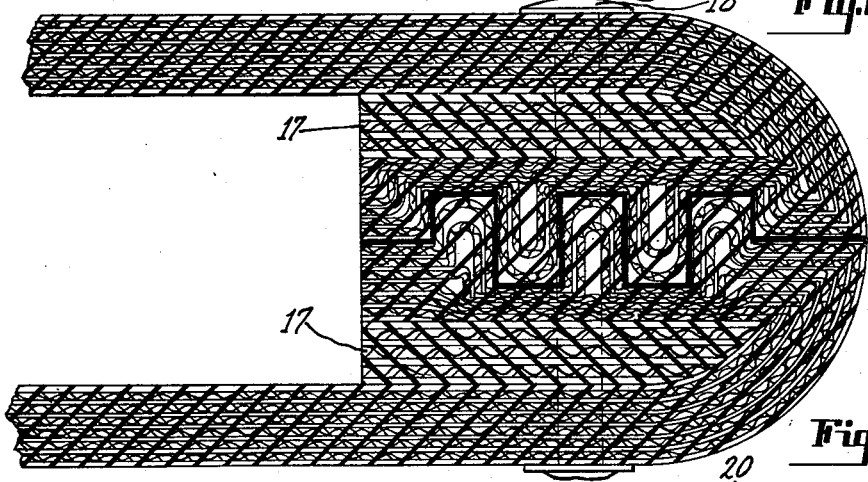
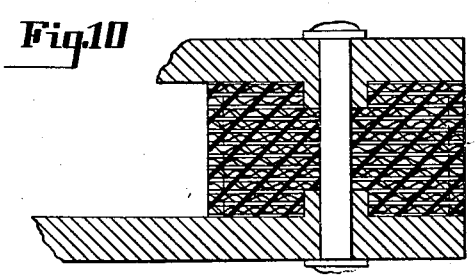
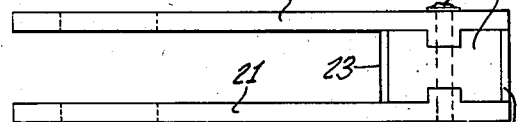

Oct. 8, 1940.                H. M. BACON                2,216,999
                        LUG STRAP CONSTRUCTION
                  Filed Sept. 12, 1938        5 Sheets-Sheet 3
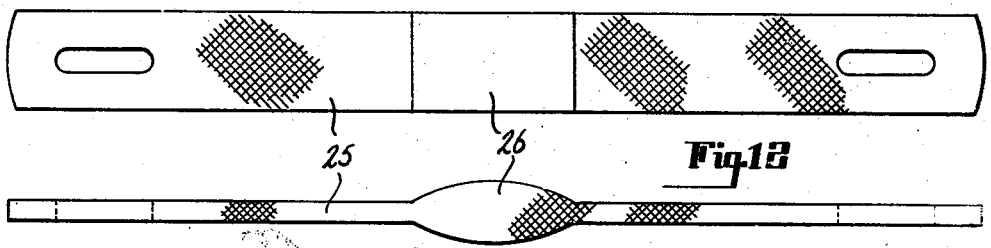
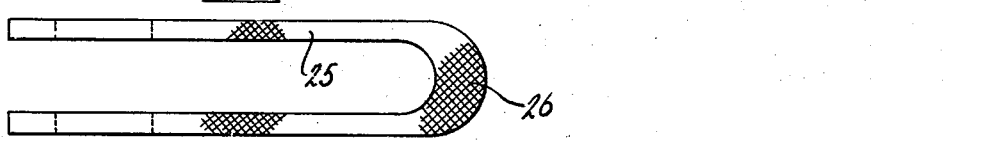
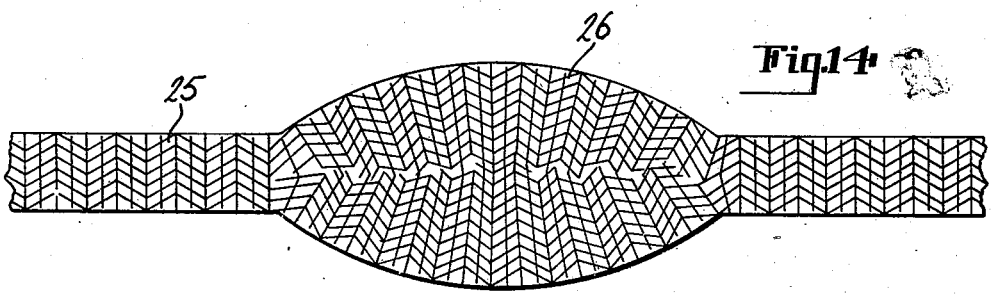
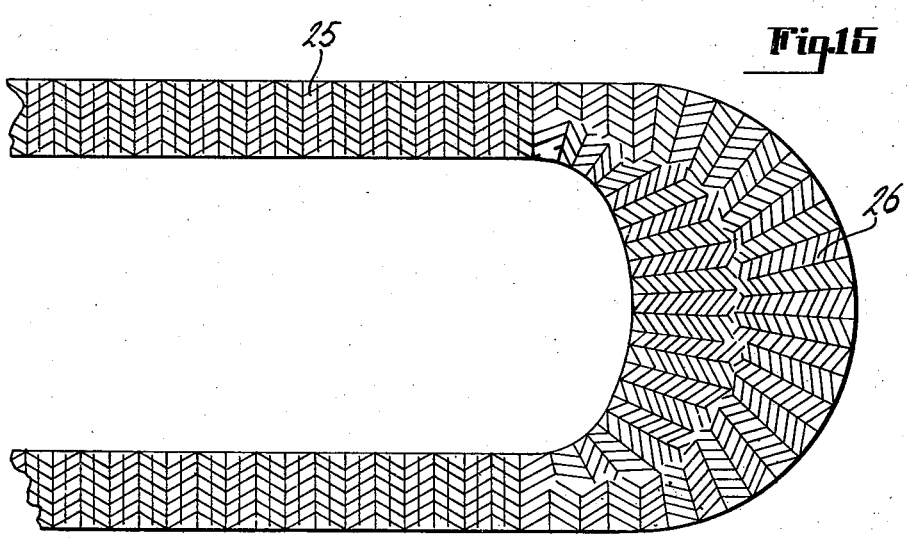
INVENTOR
HENRY M. BACON
BY
ATTORNEYS Oct. 8, 1940.　　　　　H. M. BACON　　　　　2,216,999
LUG STRAP CONSTRUCTION
Filed Sept. 12, 1938　　　　5 Sheets-Sheet 4
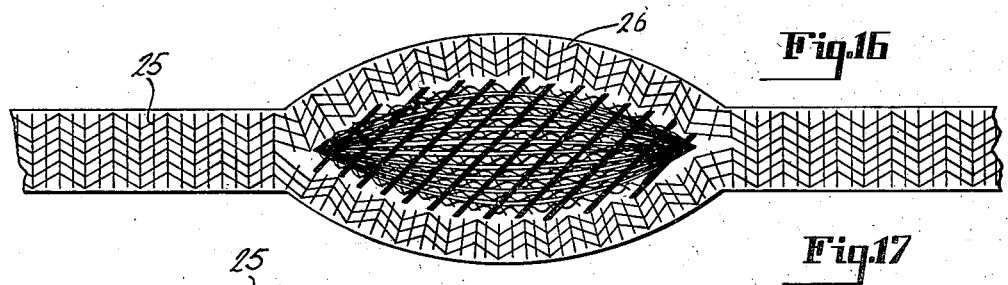
Fig.16
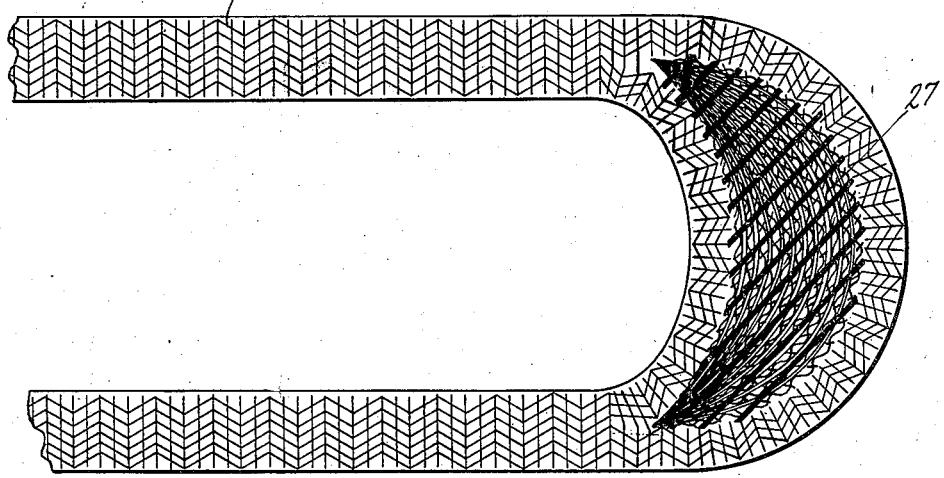
Fig.17
Fig.18
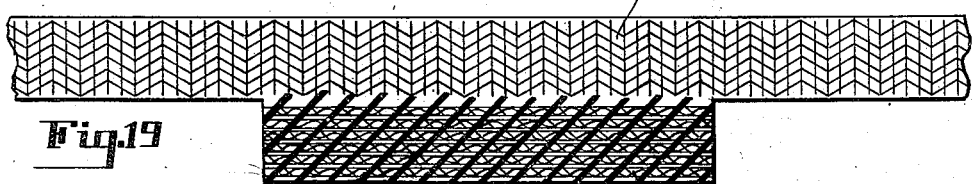
Fig.19
Fig.20
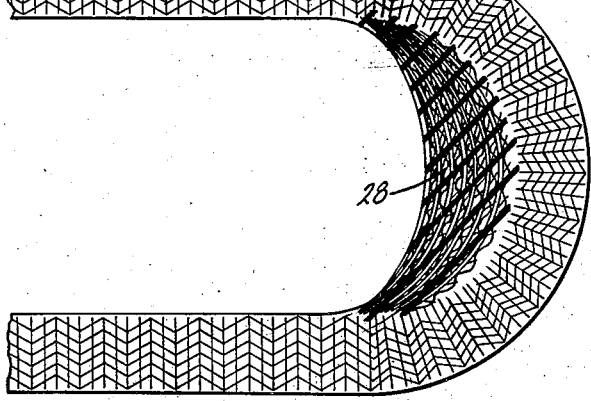
INVENTOR
HENRY M. BACON
BY Toulmin & Toulmin
ATTORNEYS

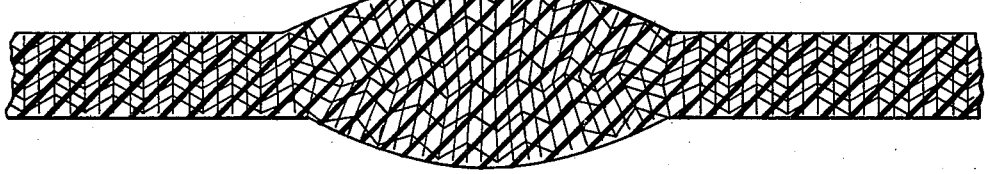
Fig.21
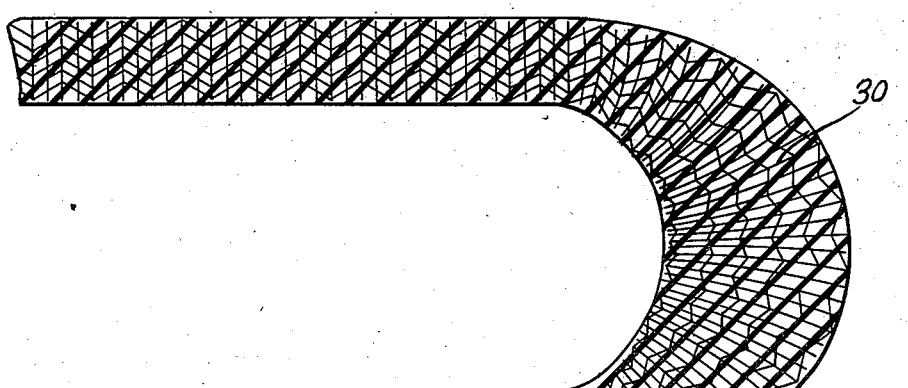
Fig.22
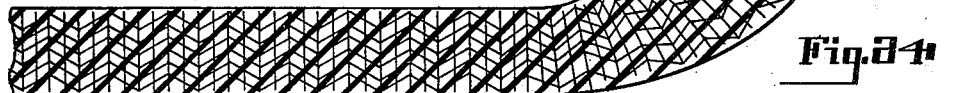
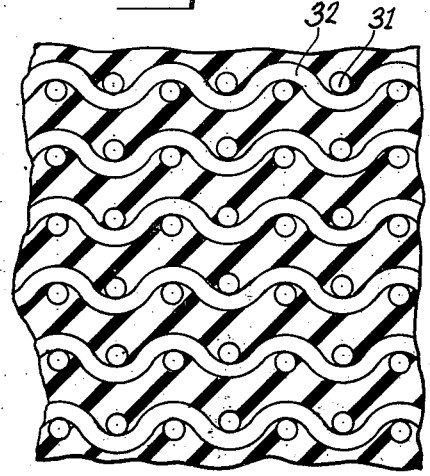
Fig.23
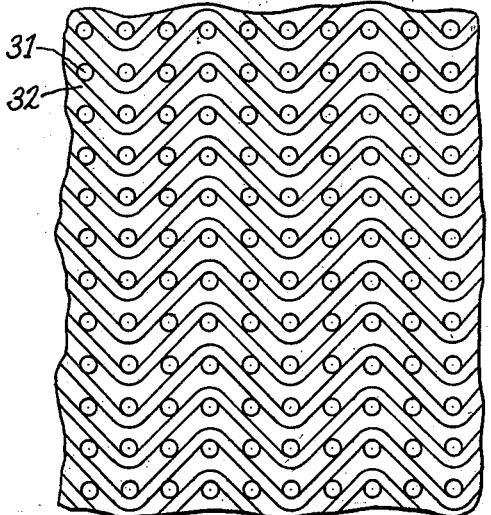
Fig.24

Patented Oct. 8, 1940

2,216,999

UNITED STATES PATENT OFFICE 2,216,999

LUG STRAP CONSTRUCTION

Henry M. Bacon, Dayton, Ohio, assignor to The Dayton Rubber Mfg. Company, Dayton, Ohio, a corporation of Ohio Application September 12, 1938, Serial No. 229,485

6 Claims. (Cl. 139—153)

This invention relates to lug straps used in loom machinery and their method of construction.

Lug straps heretofore have been made of leather, wood, canvas duck or ticking. The strap was built up of plies or laminated sections which were cemented together in the form of a strap and then bent or molded into the desired U-shape. In this construction of the lug straps, using the materials mentioned, it has been found impossible to produce a lug strap of uniformly distributed resistance to working stresses and consequently the length of service of lug straps thus formed is comparatively short.

This is due principally to the impairment brought about incident to the bending of the materials forming the strap into the required U-shape. This bending sets up tension in the outside portion of the bend, and compression stresses in the material forming the inside portion of the bend.

In the case of lug straps made of fabric, leather plies, and the like cemented together with glue, the tension and compression stresses produced in the bow materially lower the efficiency and length of service of the straps in use. This is particularly true in connection with the use of glue which tends at times to soften under the humidity of the weave room, while at other times it becomes brittle and cracks under the shocks and flexure to which the strap is subjected in service and handling.

Attempts have been made to overcome these defects, but they involve intricate and costly methods of construction which entail many other disadvantages without completely solving the problem.

The construction of lug straps according to this invention overcomes the defects noted and provides a very durable lug strap of improved construction at a low cost. A relatively simple and inexpensive method is employed whereby lug straps of uniform quality can be made in large quantities.

An object of this invention is to provide an improved lug strap which is inexpensive to make and is resistant to distortion and wear resulting in fewer interruptions in production because of adjustments necessary, or failures.

Another object is to provide a lug strap of uniform durability constructed so as to be substantially free from the detrimental stresses in the body or bend portion of the U-shaped strap.

Another object is to provide a novel lug strap constructed of two or more parts which can be readily removed and replaced when necessary.

Another object is to provide a lug strap wherein the plug section is made reversible for providing double wear.

Another object is to provide a lug strap of reinforced construction to enhance its wearing properties.

Another object is to provide a lug strap of molded construction by a low cost method of manufacture.

Other objects and advantages of this invention will be apparent to those versed in the art during the course of the following description.

Referring to the drawings:

Figure 1 is a side elevation view of a lug strap with adjacent working parts;

Figure 2 is a side view of a strap embodying this invention prior to forming it into a U-shaped lug strap;

Figure 3 is a plan view of the same prior to bending it into shape;

Figure 4 is a plan view of the assembled lug strap with inserted plug;

Figure 5 is an enlarged detail view in section, showing the construction of the bend or body of the lug strap;

Figure 6 is a similar enlarged sectional view, showing the construction of the assembled lug strap;

Figure 7 is a diagrammatic view of a two-piece full molded in plug type lug strap;

Figure 8 is an enlarged sectional view of the two-piece lug strap illustrating the construction thereof;

Figure 9 is a diagrammatic plan view of a modified two-piece lug strap wherein the plug is reversible;

Figure 10 is an enlarged sectional view of the lug strap illustrated in Figure 9, taken through the rivet portion with adjacent parts broken away showing the construction of the strap;

Figure 11 is a plan view of a strap made of heavy woven webbing prior to bending it into a U-shaped lug strap;

Figure 12 is a side elevation view of the strap shown in Figure 11;

Figure 13 is a plan view of the finished strap shaped to desired form;

Figures 14 and 15 are enlarged sectional views of the central portion of the strap before and after bending;

Figures 16 and 17 are sectional views, similar to Figures 14 and 15, showing a modified construction of the bend comprising the use of a cushion or filler strips;

Figure 18 is a detail sectional view of a portion of a strap showing the method of forming the cushion or filler section on the strap forming the inside part of the bend;

Figure 19 is a similar sectional view through the bend portion of the strap after molding it into U-shape;

Figure 20 is a sectional view of a portion of a lug strap constructed of fabric or the like impregnated with an excessive amount of rubber or other thermo-setting material prior to molding the same into the desired U-shape;

Figures 21 and 22 are sectional views of the lug strap molded from the excess impregnated fabric illustrated in Figure 20, before and after bending, respectively;

Figures 23 and 24 are enlarged detail sectional views showing the construction of the rubberized fabric and the heavy woven webbing respectively, as employed for constructing the lug strap of this invention.

The lug strap of this invention may be made of a variety of materials, such as metal, wood, leather, fibre, heavy woven webbing, "Bakelite," "Micarta," rubber, rubberized fabric, thermosetting resin impregnated fabric, and the like. The sides of the lug strap may be formed of different material from the plug or filler portion; for instance, the sides can be made of metal or wood while the plug or filler is formed of different material, such as rubberized or glue treated fabric, "Micarta," "Bakelite," pressed leather, or other suitable material which will be wear resistant and provide a cushion against the impact to which the lug strap is subjected during use.

In this connection it will be understood that the particular materials employed for making the lug straps will depend largely upon the conditions to which the strap will be subjected during use and the relative cost of the materials available for making the strap.

Referring to the drawings in detail, Figure 1 illustrates the position of a lug strap and adjacent working parts in a loom. The lug strap 1 is attached to a pitman 2 by means of a bolt 3 which extends through the pitman and engages the legs of the strap through the slotted openings 4. The slotted opening 4 provides longitudinal adjustment of the strap so it will properly engage the picker stick 5.

In the construction of the lug strap illustrated in Figures 2 to 6 inclusive, a relatively wide sheet 6 of heavy rubberized woven fabric or webbing is selected and cut to the desired size and shape. Slots 7 are formed in the sheet on each side of the central portion and the strip is then molded or otherwise formed so that the center portion will be provided with indentations or corrugations 8 on the top and bottom sides.

The strip is then bent around the plug or filler member 9 to form a U-shaped lug strap and the parts are secured together by means of the rivet 10 which is passed through the plug 9 and to the outside of the leg members 11. The bending of the strip to form the U-shaped strap is done while the rubber or resin is in the raw or slightly set stage. Thereafter the assembled strap is subjected to complete vulcanization or thermo-setting of the binder to produce the finished lug strap illustrated in Figure 4.

The treatment of the center portion to produce a bend or bow is an important feature of the construction of this lug strap. The fibre strands 12 which form the body of the strap are unimpaired during the formation of the corrugated central portion so that the full strength of the fibres is maintained throughout the strap and central section. The bending action, as shown in Figures 4 and 6, compresses the inner folds 13, while the outer folds 14 broaden, allowing the formation of the bend. This construction retains the full fibre strength and makes bending easy, and provides a good cushion for the plug.

Due to the tendency of bias cut fabric to stretch, it has been found to be unsuited for the making of lug straps. Further, straight cut fabric even after preliminary vulcanization will break when bent so as to form a U-shaped lug strap, unless it is treated at the bend in the manner indicated in Figures 2 to 6.

In the construction of the lug strap as illustrated in Figures 2 to 6, the use of low cost flat plate molds is possible and the straps may be die cut to the desired shape from slabs of the material. A combination forming and uniting tool can be used to bend the sides of the strap around the plug member and insert and rivet the plug thereto in one operation.

In the modification illustrated in Figures 7 and 8, a two-piece full molded-in plug type of lug strap is produced which is made of the sections 15 and 16. In this unique construction the full strength of the sides is carried back on itself in a fold enclosing a filler strip 17 to complete the molded half plug, as illustrated in Figure 8. The doubling back of the side plies makes loosening of the plug an impossibility so long as the rivet 18 functions to prevent spreading of the molded body.

Additional strength and a reduction in the tendency to spread are obtained by dovetailing or interlocking the molded half sections 15 and 16 together, as shown at 19 in Figure 7. This construction also provides rigidity to the lug strap and aids materially in the ease and speed of assembly.

It will be understood that the filler strip 17 may be made from one or more of the various materials heretofore mentioned, and forms the core of the folded back impregnated fabric portions engaged therearound. The fillers surrounding the thermo-plastic material are molded together to form the integral parts 15 and 16. Selection of the type of filler strip used in this construction enables the cushioning properties of the plug to be closely controlled, as it will be obvious that a softer or harder plug may be employed, as desired, so as to vary the cushioning properties of the filler strip. It will be appreciated that in this two-piece construction the parts 15 and 16 forming the sides of the lug strap may be formed from one of the materials mentioned, or a combination thereof.

In Figures 9 and 10 there is shown a three-piece lug strap construction wherein the sides 20 and 21 are molded or otherwise formed in one piece and the filler or plug 22 is made so that the ends 23 can be reversed to provide double wear. Since the inner sides of the plugs receive most of the wear in use, this provision practically doubles the life of the strap. This form affords a three-piece lug strap which can be made from a variety of materials, for instance, rubber, fabric, fibre, wood, "Micarta," or metal. Further the side members 20 and 21 may be formed of one material while the reversible plug member may be made of the same or different material. It will be observed in this construction that the plugs are readily removable by withdrawing the rivet 24 so that the plugs can be removed and reversed or replaced as required.

Another modification of the lug strap construction is shown in Figures 11 to 15, wherein there is diagrammatically illustrated heavy woven webbing, such as is regularly employed in the forming of heavy strapping for woven belts, upholstery webbing, and the like. In this arrangement the lug strap comprises a heavy webbing 25 which is especially woven to provide an enlarged cushion and reinforcing middle section 26 which forms the U or bend of the lug strap. The purpose of this enlarged or reinforced cushion portion 26 is to produce a longer wearing strap and eliminate the use of plugs or fillers and provide a one-piece lug strap construction.

The cushion section 26 can be obtained in several different ways, which are as follows:

(1) The central or cushioning section can be produced on the weaving loom or knitted by an automatic arrangement to weave a thicker portion at certain places on the strip. The woven strip can then be subsequently cut so as to have the thicker woven portion at the middle, as illustrated in Figure 14.

(2) It can be obtained by inserting fillers or cushion strips, and weaving a cover over them to provide a raised or thick central portion, which forms the bend of the U-shaped strap, as shown in Figures 16 and 17.

In Figures 16 and 17, a lug strap is illustrated wherein the bend or bow of the strap is provided with inserts 27 which, as heretofore stated, may be made of a variety of materials, preferably rubber, rubberized fabric, or thermo-setting resin impregnated fabric is employed. The filler or cushion insert 27 is centrally disposed in a section of the strip and a woven cover provided thereover to produce an enlarged portion in the strip, as illustrated in Figure 16. The strip is then bent into U-shape and the whole molded or thermoset to provide a one-piece strap having a reinforced bend.

(3) The cushion can be produced also by applying materials, such as rubberized fabric or leather strips, to the inside of the curved portions and molding or otherwise securing them thereto so that the bow of the U-shaped strap will be provided with a tough, impact-resistant section.

In this construction, as illustrated in Figures 18 and 19, the bend or bow of the U-shaped strap is formed by applying a layer or filler block or strip 28 onto the strip 29 at the place where the inside of the curved bow will be formed. Thereafter the strip 29 is bent to form the U strap and the whole molded or otherwise set so that the strip portion 28 will form the inside of the bow, as shown in Figure 19, which affords a thick reinforced cushion for resisting the impact of the picker stick.

(4) The cushioning section may also be produced by impregnating the flat woven webbing with an excess quantity of rubber or other thermo-setting materials, such as synthetic resins, which have sufficient flow prior to setting, and thereafter molding the lug strap so as to force the excess material into the bow or bend area.

Figures 21 and 22 show a modified one-piece construction of a lug strap wherein the impregnated woven webbing is provided with an excess quantity of impregnating material, which may be of rubber or thermo-setting substance, and during the subsequent molding the excess impregnant is forced into the bow or bend so as to build it up to form a thick cushion section, as indicated at 30 in Figure 22. In this construction, the initial strip will be wider than the final molded form since in the molding the portions forming the sides or legs are compressed to a lesser thickness and excess binder will be forced out of the sides of the strap into the bow, to provide a relatively thick portion.

The one piece lug strap construction lends itself readily to machine production and a sturdy light weight lug strap can be produced at low cost. The one-piece lug strap is not quite so easy to install in use, but for certain types of work this lug strap gives excellent results.

Figures 23 and 24 show in enlarged section the preferred heavy woven fabric construction to be employed in making the lug straps of this invention. In the sectional view shown in Figure 23, the weft fibers 31 and warp threads 32 are woven somewhat looser than in the closely woven fabric construction illustrated in Figure 24. The heavy closely woven fabric generally is preferred; however, where the fabric is to be impregnated with large amounts of thermo-setting binders, the more loosely woven fabric may be used.

The lug straps of this invention may be made of one or more pieces without the use of thermo-setting binders, and when made of fabric the closely woven fabric construction illustrated in Figure 24 is preferred. The fibres making up the woven fabric may in some instances comprise metal, glass, or equivalent synthetic fibre of organic as well as inorganic origin, and the fibre bonding agents may or may not be used, as desired.

It will be appreciated, of course, that this invention is not limited to the exact details of lug strap construction and the method of making as disclosed, since obvious modifications within the scope of this invention may be made by persons skilled in the art.

Having thus fully described my invention, what I claim as new and desire to secure by Letters Patent is:

1. A lug strap comprising a U-shaped body formed from a moldable composition of controllable hardness, the bow or bend portion of said body being of corrugated construction to reinforce the same and provide for the broadening of the outer folds and the compression of the inner folds at the bend so as to retain the full strength of the body throughout the bow and produce a lug strap having uniformly distributed resistance to working stresses.

2. An improved process of making lug straps, comprising the steps of (a) weaving a heavy woven webbing in the form of a strap, (b) forming slots in the outer end portions of said strap, (c) forming corrugations in the middle portion of said strap, and (d) bending said strap around a filler member to form a U-shaped lug strap.

3. An improved method of making a lug strap, comprising the steps of (a) forming a relatively wide strip of heavy woven fabric, (b) impregnating said fabric to provide a rubberized strip, (c) corrugating a portion of said strip, (d) bending said strip in the form of a U-shaped member wherein the corrugated section forms the bend or bow, (e) inserting a U-shaped plug in the closed end thereof, and (f) molding and vulcanizing the rubber to produce a finished U-shaped lug strap.

4. A lug strap comprising a U-shaped body wherein the bow or bend portion comprises corrugations to provide for the stretching of the material in the outer part of the bend and compression of the material forming the inner part of said bend so as to retain the full strength of the body throughout the bow, said bow being provided with a filler member of tough impact-resistant material to produce a lug strap having uniform resistance to working stresses.

5. In combination, a lug strap of interwoven rubber treated fabric construction having a corrugated arcuate portion with parallel legs extending therefrom, and a reinforcing cushioning member secured between said legs and adjacent said corrugated arcuate portion.

6. A U-shaped lug strap comprising a plurality of parts formed from a moldable composition of controllable hardness, the bow or bend portion being of undulated construction and enclosing a filler part which is bound between the opposed legs of said strap and adapted to cushion the contact of the lug strap with the picker stick, said undulated bow portion and filler means being shaped and positioned to produce a lug strap having uniformly distributed resistance to working stresses.

HENRY M. BACON.